May 3, 1966  E. L. STEIN ETAL  3,248,816
DISPLAY SIGN HAVING LIGHT REFLECTING SURFACES AND MEANS FOR
CAUSING A SHIMMERING REFLECTIVE EFFECT
Filed April 27, 1960  3 Sheets-Sheet 3
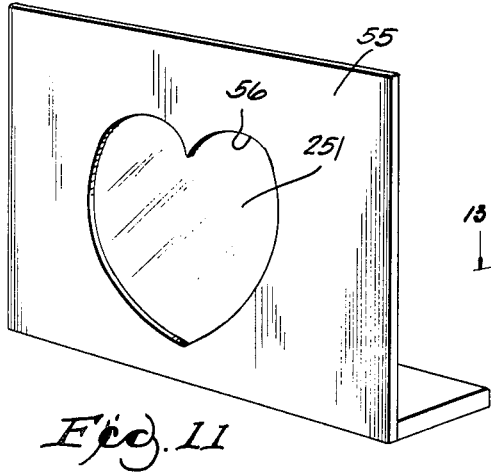
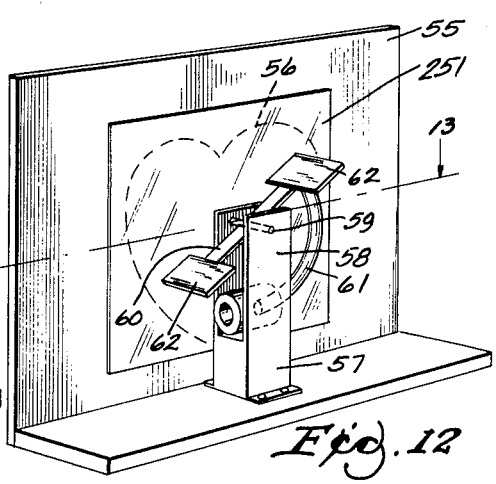
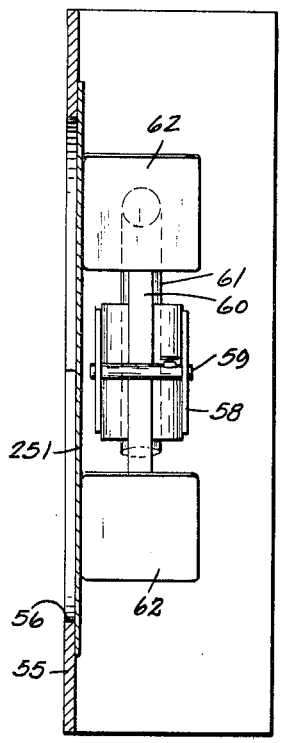
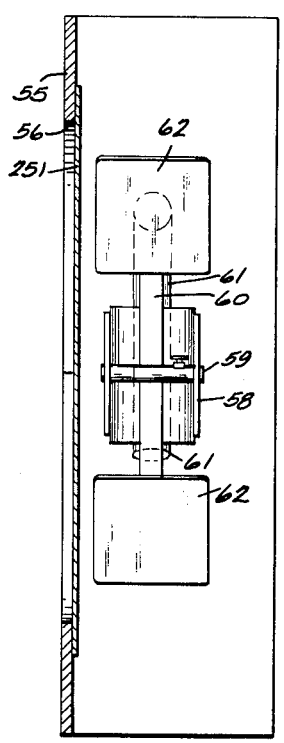
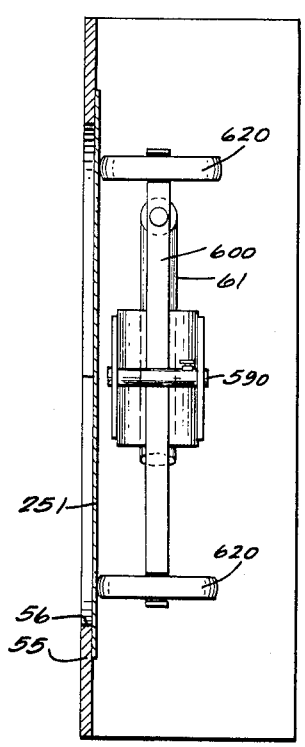
INVENTORS
ELMER L. STEIN
WILLIAM E. BLEDSOE, JR.
BY
Wheeler, Wheeler & Wheeler
ATTORNEYS

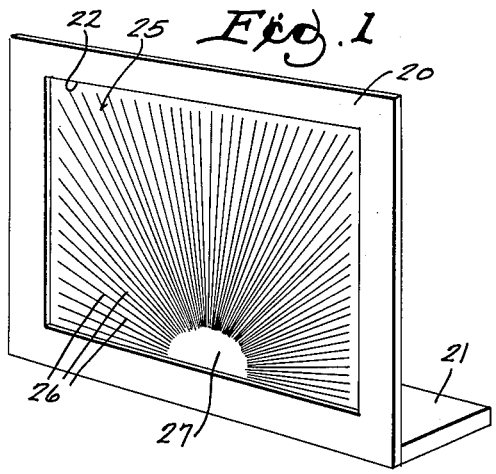
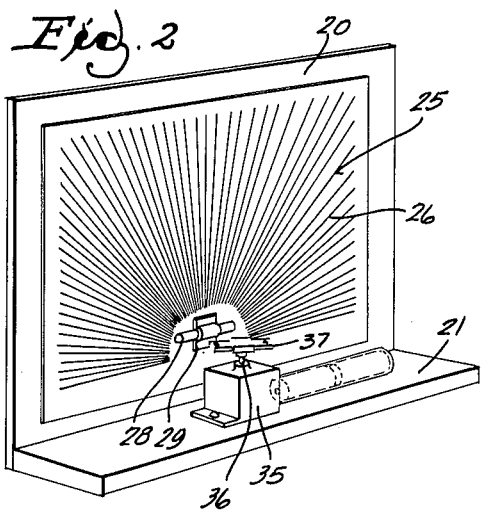
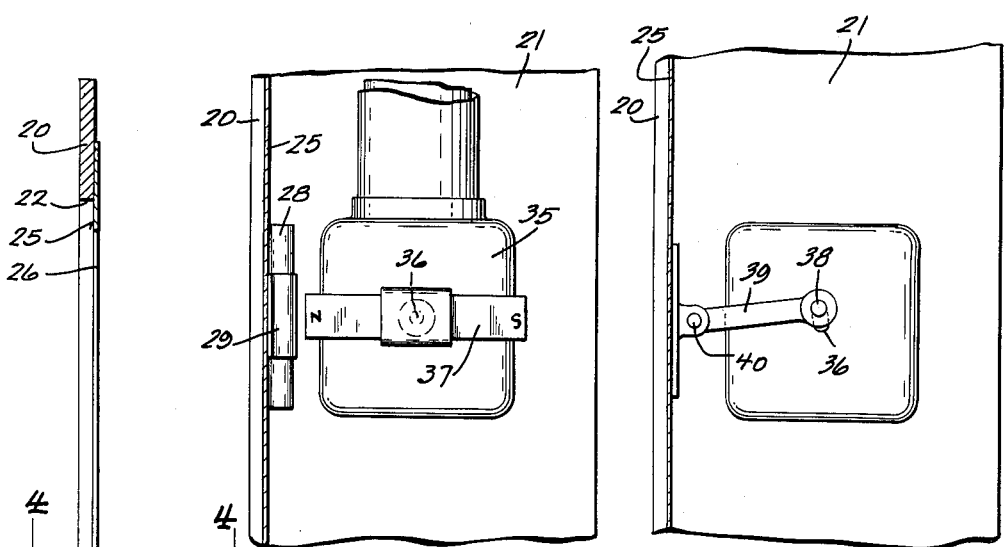
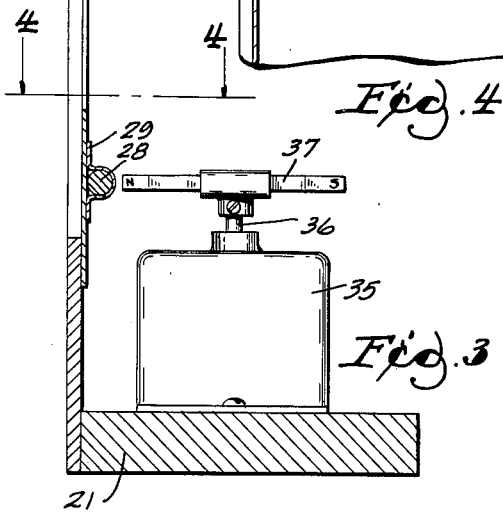
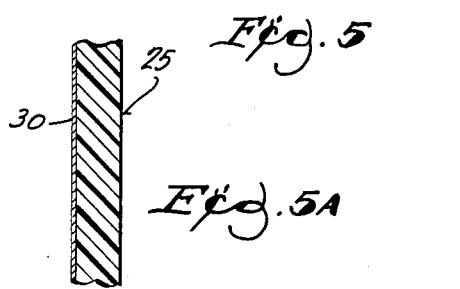

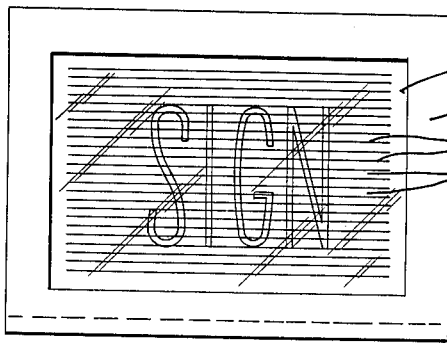
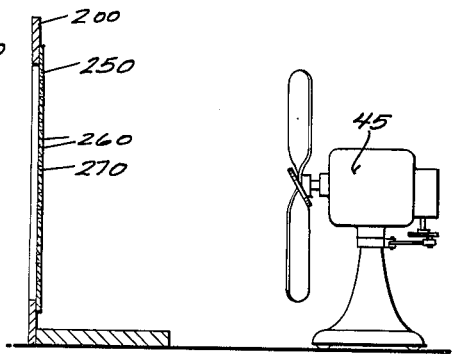
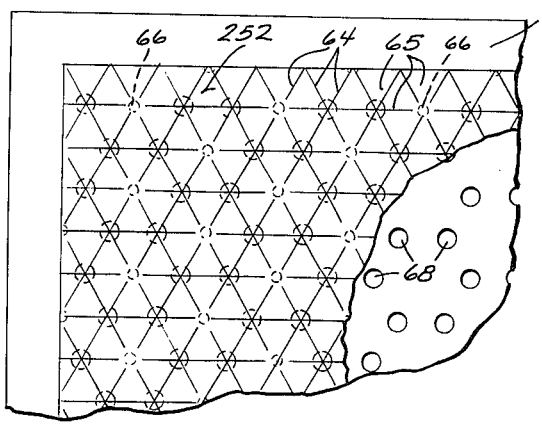
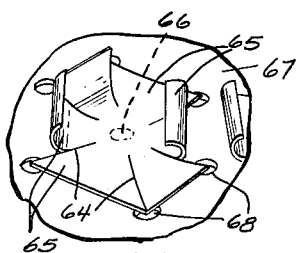
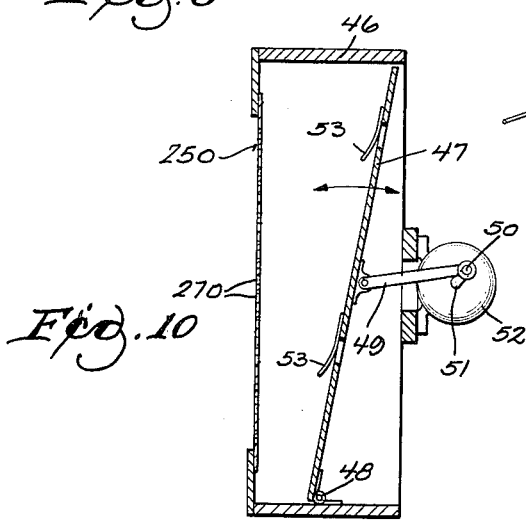
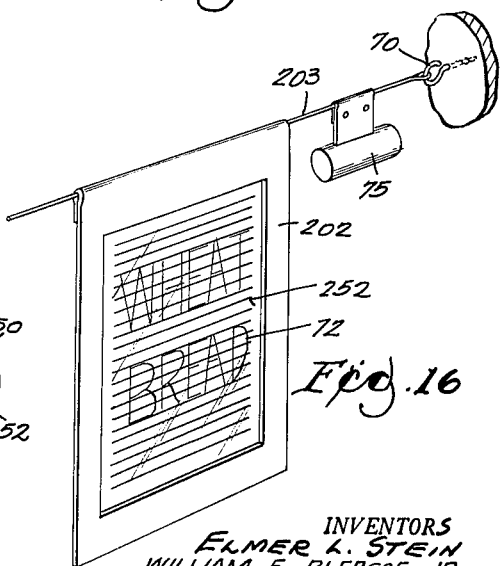

United States Patent Office 3,248,816
Patented May 3, 1966

3,248,816
DISPLAY SIGN HAVING LIGHT REFLECTING SURFACES AND MEANS FOR CAUSING A SHIMMERING REFLECTIVE EFFECT
Elmer L. Stein, Milwaukee, and William E. Bledsoe, Jr., Colgate, Wis., assignors, by direct and mesne assignments, to Vibrite Corporation, Milwaukee, Wis., a corporation of Wisconsin
Filed Apr. 27, 1960, Ser. No. 25,024
2 Claims. (Cl. 40—139)

This invention relates to a display sign having light reflecting surfaces and means for causing a shimmering reflective effect.

The invention contemplates the use of a web or film of very thin material, the synthetic resin known as "Mylar" being ideal because of its extraordinary resilience. Whatever the material of the web or film, it is extremely light and thin by preference and has a specular coating such as highly polished aluminum. Similar material is disclosed in my pending application entitled Flashing Reflective Display, Serial No. 822,638, filed June 24, 1959, now U.S. Patent No. 3,032,906. The present invention produces quite a different effect from that of the material disclosed in the companion case above identified. According to the present invention, wave motion is propagated in the web or film to cause its specular surface to shimmer. The surface may be continuous or cut into tongues as in the companion case or it may be slit into strips or ribbons which may be anchored at both ends and the slits may either be parallel or convergent or otherwise.

A variety of expedients are disclosed, all of which have been used successfully to propagate wave motion in the film or sheet and create the desired shimmering effect in the display. The display may merely be a part of some other display or it may be a background in front of which some other display is placed, or display material may be painted or otherwise shown on the face of the film or web.

The means for propagating wave motion in the film or web may be mechanical, electrostatic, magnetic or pneumatic, several expedients in some of these categories being disclosed herein.

In the drawings:

FIG. 1 is a view in perspective of a display embodying the invention.

FIG. 2 is a view in three-quarter rear perspective of the display shown in FIG. 1.

FIG. 3 is a detailed view on an enlarged scale taken in section on the line 3—3 of FIG. 2.

FIG. 4 is a detailed view taken in horizontal section on the line 4—4 of FIG. 3.

FIG. 5 is a fragmentary detailed view similar to FIG. 3 but showing a modified means of imparting wave motion to the display.

FIG. 5a is an enlarged detailed view similar to FIG. 3, fragmentarily illustrating a portion of the display film or web in section on an enlarged scale.

FIG. 6 is a front elevational view of a modified display embodying the invention.

FIG. 7 is an enlarged detailed view taken in section on the line 7—7 of FIG. 6.

FIG. 8 is an enlarged elevational view fragmentarily showing a portion of a further modified display embodying the invention, portions being broken away to expose a perforated backing ply.

FIG. 9 is a still further enlarged fragmentary detailed view showing in perspective portions of the display material in FIG. 8.

FIG. 10 is a view in vertical section showing a further modified embodiment of the invention.

FIG. 11 is a view in perspective showing a further modifed embodiment of the invention.

FIG. 12 is a view in three-quarter rear perspective showing the back of the device illustrated in FIG. 10.

FIG. 13 is an enlarged fragmentaray detailed view taken in horizontal section on the line 13—13 of FIG. 10.

FIG. 14 is a view similar to FIG. 13 but showing the parts slightly separated to bring out a different principle of operation.

FIG. 15 is a view similar to FIG. 13 showing a further modified embodiment of the invention.

FIG. 16 is a detailed view in perspective showing a further modified embodiment of the invention.

In FIGS. 1 to 3, a support 20 of any suitable nature is mounted on a base 21 and may have the characteristics of a frame with a central opening at 22 spanned by a film or web of extremely thin flexible but elastic material with a specular surface. The material is generically designated by reference character 25. As noted in the preamble, Mylar with an aluminum coating has been found ideal. It is superior to any other film or synthetic resin which we have tested and it is very notably superior to foil. Foil does not have the desired elasticity and it also appears to be unduly heavy. In any event it does not respond as readily as Mylar to wave motion to produce the desired shimmering effect.

In order to produce a particular effect which represents a sunburst behind an advertising product, the intermediate portions of the specularly surfaced film 25 are subdivided by slits 26 which are generally radial from a central area at 27 to which the armature 28 is attached, as by means of a piece of gummed tape at 29. In FIG. 5a we have shown greatly enlarged a cross-section through the film 25, the specular coating being shown at 30, although necessarily exaggerated.

On the base 21 behind the display is a motor 35 of known design. It is desirably self-contained, having its own batteries and gear reducer (not shown). The output shaft 36 carries a magnet 37 which rotates in operative proximity to the armature 28 to attract and alternately to release the armature from its magnetic influence. This causes a wave of motion to be developed in the film 25. Due to the fact that the several slits 26 radiate from the central portion 27 to which the armature 28 is mounted, the vibrations travel radially up the ribbons of material between the divergent slits, giving to the film a shimmering sunburst effect which attracts attention to anything with which the display is associated.

Obviously, it is immaterial whether the magnet is on the motor driven shaft and the armature on the vibratory film or vice versa. It is, however, desirable that the frequency with which the magnet and armature attract each other is a frequency to which the film is capable of responding for the propagation through the film of the resulting wave motion. One of the advantages in the use of the preferred Mylar film is its ability to respond to wave motion of almost any frequency.

By providing the motor driven shaft 36 with a crank 38 having connecting rod 39 pivotally attached at 40 to the film 25, the desired waves can be propagated by motion transmitted mechanically rather than magnetically from the shaft to the film. This is shown in FIG. 5.

FIG. 6 shows a film 250 mounted in a frame 200. This film is subdivided by horizontal slits 260 into ribbons 270. By way of exemplification, the slits 260 are horizontal and parallel and the message represented by the letters S-I-G-N is printed on the face of the film 250 in such dimensions as to span a number of the ribbons into which the exposed or intermediate area of the film is divided by the slits.

While this film may be subjected to wave motion by communicating energy to it in the manner suggested in FIGS. 2 to 5, it is used as a basis for further disclosure of air currents as the source of such motion. Thus, in FIG. 7, the advertising display of FIG. 6 is shown exposed to currents from a conventional oscillating fan 45. As the fan operates from side to side successive air blasts from the fan strike the slitted film 250. The air currents, in forcing their way through the slits 260, bring about vibration of the individual ribbons 270 across which the display characters are printed, thus producing a shimmering effect which results from light reflected from the specular surfaces of selected portions of the ribbons. It is, of course, immaterial whether the display lights represented by the characters S-I-G-N are reflective and the remaining ribbon surfaces non-reflective or whether the entire area of film 250 is specular except where the reflective quality is destroyed by painting the symbols across the film.

Various other means of developing air currents for producing shimmering movement of the specular film will be disclosed hereafter.

In FIG. 10 the film 250 has been mounted across the face of a box-like cylinder 46 in which a piston-like plate 47 is pivoted at 48 and connected by connecting rod 49 to crank 50 of the shaft 51 driven by motor 52. As the piston 47 oscillates in the cylinder 46 it sets into motion air currents which are admitted to the cylinder through check valve 53 and escape from the cylinder between the ribbons 270 of the film 250, thereby setting up the wave motions in the specular surfaced film to produce the shimmering effect already described.

FIGS. 11 to 14 inclusive, disclose a panel 55 which has a heart-shaped opening at 56 spanned by a specular film 251. The opening is shown to be of heart-shape but this is unimportant except insofar as this suggests the use of a colored film without any other message to attract attention for the purpose of symbolizing a holiday such as Valentine's Day.

To set up vibrations in the specular surfaced film 251 for the purpose of causing the desired shimmering effect, either mechanical or pneumatic means may be employed. Illustrated for the purpose is a conventional oscillating type of engine electromagnetically operated. Being conventional, the mechanism is neither illustrated nor described in detail. It is housed in a box 57 having upwardly extending sides at 58 spanned by a pintle 59 upon which the lever 60 is pivoted. This lever is connected with the free end of the arcuate armature 61 of the engine. The lever carries one or more blades 62 at its end or ends. If these are set in sufficiently close proximity to the film 251 so that they are in wiping contact with it, the desired shimmering movement of the film results from the mechanical contact. This arrangement is shown in FIGS. 12 and 13. If the blades 62 are spaced slightly from the specular surfaced film 251 as shown in FIG. 14, then the shimmering effect is the result of movement communicated to the film by the air currents resulting from the oscillating motion of the blades 62 on lever 60.

FIG. 15 merely suggests how rollers 620 may be substituted for the blades 62 when there is to be direct contact with the rear surface of the film as shown in FIGS. 12 and 13. In FIG. 15, the rollers 620 are at the ends of a lever 600 carried by a rockshaft 590 having any appropriate means of oscillation.

FIGS. 8 and 9 disclose a specularly surfaced film 252 subdivided by generally radial slits 64 into tongues 65 as disclosed in my companion application, Serial No. 822,638, the several tongues being arranged in a hexagonal pattern and having common mounting points at which they are connected by spots of adhesive 66 to a supporting panel 67. The tongues 65 are free of the panel throughout most of their extent and they overlie apertures 68 with which the panel is provided. Any means of inducing air currents outwardly through these apertures 68 will cause the tongues to vibrate. Such means are suggested by the fan 45 in FIG. 7 and the blades 62 of FIG. 14. Also any bodily backward movement of the panel 67 will cause the air displaced by such movement to escape through the apertures 68 to cause the tongues 65 to flutter.

In FIG. 16 the display comprises a frame or panel 202 suspended on a wire at 203 which may be stretched, for example, across the aisle of a store or market, being connected at its ends with a screw eye such as that shown at 70. Spanning the frame 202 is a film 252 which may correspond to any of those above described, either being bodily subject to vibration or subdivided into tongues or ribbons for this purpose. On the otherwise specular surface of such a film are printed or otherwise affixed the advertising characters 72. If the wire 203 is caused in any manner to vibrate or oscillate, the motion communicated to the film 252 will establish corresponding movement in the film whereby its specular surface will have the desired shimmering effect to attract attention to the advertising symbols. As one means of achieving such vibration we have shown a self-contained vibratory motor 75 suspended from the wire 203. This motor may be of a type packaged with its own batteries, whereby it requires no external electrical connection. The vibration results, in known manner, from eccentrically weighting its driven shaft (not shown). Except as stated in the accompanying claims we do not wish to be limited to any particular means of communicating vibratory motion to the wire 203.

While Mylar film (polyester resin) is preferred over all other films thus far tested, there are many others which are usable. The required characteristics are thickness, lightness and at least some measure of resilience in its flexibility. Where the vibration is to have relatively high frequency it is preferred that the film be somewhat stretched. This has been done in practice by stretching the film across the opening of a glued frame and maintaining the film under tension until the glue sets to adhere the tensioned film to the frame such as that shown at 200 in FIG. 6 or at 20 in FIG. 1.

Where the periodicity of the desired motion is low, as in a sign simulating the waves of the sea relatively inelastic films can be used, even including a tensioned film of natural or synthetic rubber, or paper.

Films having intermediate qualities have been tested successfully including cellophane, acetate, vinyl chloride and polyethylene. It will, of course, be understood that ordinarily the films used will have a high reflective specular coating as shown is enlarged detail in FIG. 5a.

I claim:

1. In a device for causing a shimmering reflective effect, the combination with a film having a specular coating, of a mount to which portions of said film are attached, other portions of said film being free of said mount, and means for effecting controlled movement of said other portions with respect to said mount, said film having slits subdividing its said other portions into components individually movable respecting the mount, the slits radiating from a predetermined center and the means for effecting relative movement having an opearting connection to such center.

2. The combination with a mounting means of a specularly surfaced film having portions connected with said mounting means and other portions free thereof and means for effecting relative movement between the connected and free portions of said film and including a motor driven shaft, a magnet element, an armature element and means mounting one of said elements to a movable portion of the film and another of said elements to said shaft whereby rotation of the shaft causes a shimmering reflective effect.

References Cited by the Examiner

UNITED STATES PATENTS

| | | | |
|---|---|---|---|
| 1,777,933 | 10/1930 | O'Brien | 40—218 |
| 2,215,550 | 9/1940 | Gray | 40—139 |
| 2,302,524 | 11/1942 | Borregard | 40—218 |
| 2,530,404 | 11/1950 | Seares | 40—139 |

EUGENE R. CAPOZIO, *Primary Examiner.*

EDWARD V. BENHAM, JEROME SCHNALL,
*Examiners.*

K. E. PRUDEN, WENCELSO J. CONTRERAS,
*Assistant Examiners.*